United States Patent
Cotter (10) Patent No.: US 11,278,146 B2
(45) Date of Patent: Mar. 22, 2022

(54) APPLE PARER

(71) Applicant: Progressive international corporation, Kent, WA (US)

(72) Inventor: Jennifer Cotter, Seattle, WA (US)

(73) Assignee: Progressive international corporation, Kent, WA (US)

( * ) Notice: Subject to any disclaimer, the term of this patent is extended or adjusted under 35 U.S.C. 154(b) by 676 days.

(21) Appl. No.: 16/256,785

(22) Filed: Jan. 24, 2019

(65) Prior Publication Data

US 2019/0231111 A1    Aug. 1, 2019

Related U.S. Application Data

(60) Provisional application No. 62/623,925, filed on Jan. 30, 2018.

(51) Int. Cl.
*A47J 17/16* (2006.01)
*A47J 25/00* (2006.01)
*B26D 3/28* (2006.01)

(52) U.S. Cl.
CPC ............... *A47J 17/16* (2013.01); *A47J 25/00* (2013.01); *B26D 3/28* (2013.01)

(58) Field of Classification Search
CPC .............. A47J 17/16; A47J 25/00; B26D 3/28
USPC ................... 99/595, 598, 599, 539–544, 587
See application file for complete search history.

(56) References Cited

U.S. PATENT DOCUMENTS

| | | | | |
|---|---|---|---|---|
| 256,214 | A * | 4/1882 | Heizmann | A23N 4/14 99/541 |
| 256,800 | A * | 4/1882 | Holton | A23N 4/14 99/541 |
| 259,342 | A * | 6/1882 | Tripp | A23N 5/03 99/599 |
| 319,332 | A * | 6/1885 | Scott | A47J 17/16 99/545 |
| 360,527 | A * | 4/1887 | Hudson | A23N 4/14 99/541 |
| 508,137 | A * | 11/1893 | Huefner | A23N 4/14 99/543 |
| 556,875 | A * | 3/1896 | Wolf | A47J 17/16 99/595 |
| 633,932 | A * | 9/1899 | Williamson | A47J 17/16 99/598 |
| 1,256,751 | A * | 2/1918 | Wenzel | A47J 17/16 99/598 |
| 1,852,328 | A * | 4/1932 | Morral | A01F 11/06 460/40 |
| 2,620,002 | A * | 12/1952 | Lupton | A47J 17/16 99/593 |
| 2,881,469 | A * | 4/1959 | De Moss | A22C 25/17 452/130 |

(Continued)

FOREIGN PATENT DOCUMENTS

WO     WO-2017083646 A1 *   5/2017   .............. B26D 3/11

*Primary Examiner* — Sean M Michalski
(74) *Attorney, Agent, or Firm* — Lowe Graham Jones PLLC (57) ABSTRACT

An apple peeler and corer is configured with a main body having a platform which is raised above a lower foundation for the main body. A crank handle drives a threaded rod toward a blade assembly for slicing an apple. A rocker arm carries a peeler blade and may be resiliently biased toward the blade assembly or locked in a position pivoted away from the blade assembly.

12 Claims, 11 Drawing Sheets

(56) References Cited

U.S. PATENT DOCUMENTS

| | | | | |
|---|---|---|---|---|
| D254,590 S * | 4/1980 | Doyel | | 83/733 |
| 5,950,528 A * | 9/1999 | Wang | | A23N 7/026 |
| | | | | 99/542 |
| 6,516,713 B1 * | 2/2003 | Holmander | | A23N 7/026 |
| | | | | 99/541 |
| 6,854,383 B2 * | 2/2005 | Wang | | A47J 17/16 |
| | | | | 99/542 |
| 7,066,071 B2 * | 6/2006 | Zeder | | B26D 3/283 |
| | | | | 30/278 |
| 7,077,058 B2 * | 7/2006 | Muro | | A47J 17/16 |
| | | | | 99/541 |
| D535,534 S * | 1/2007 | Wong | | D7/693 |
| D669,324 S * | 10/2012 | Bodum | | D7/693 |
| D689,348 S * | 9/2013 | Wong | | D7/693 |
| 9,521,920 B2 * | 12/2016 | Willis | | A47J 17/04 |
| D786,631 S * | 5/2017 | Kim | | D7/693 |
| 9,682,490 B2 * | 6/2017 | Stewart | | B26D 7/2628 |
| D793,181 S * | 8/2017 | Wong | | D7/693 |
| 9,826,854 B2 * | 11/2017 | Smith | | A47J 17/16 |
| 10,021,904 B1 * | 7/2018 | Fikes | | A23P 20/25 |
| D830,140 S * | 10/2018 | Chen | | D7/693 |
| 10,569,438 B2 * | 2/2020 | Bagley | | B26D 3/26 |
| 10,987,821 B2 * | 4/2021 | Li | | B26D 7/00 |
| 2004/0261634 A1 * | 12/2004 | Wang | | A47J 17/16 |
| | | | | 99/584 |
| 2006/0081108 A1 * | 4/2006 | de Buyer | | B26D 3/283 |
| | | | | 83/703 |
| 2008/0314262 A1 * | 12/2008 | Stark | | A47J 17/16 |
| | | | | 99/595 |
| 2011/0132161 A1 * | 6/2011 | Robbins | | B26D 1/03 |
| | | | | 83/13 |
| 2012/0090480 A1 * | 4/2012 | Caspar | | B26D 3/11 |
| | | | | 99/537 |
| 2012/0227564 A1 * | 9/2012 | Fung | | B26D 3/283 |
| | | | | 83/856 |
| 2015/0375414 A1 * | 12/2015 | Wong | | B26D 3/283 |
| | | | | 83/699.61 |
| 2016/0255982 A1 | 9/2016 | Benoit et al. | | |
| 2017/0136643 A1 | 5/2017 | Bagley et al. | | |
| 2017/0136644 A1 * | 5/2017 | Bagley | | B26D 3/11 |
| 2017/0305028 A1 * | 10/2017 | Zhang | | B26D 7/2628 |
| 2018/0264674 A1 * | 9/2018 | Bagley | | B26D 3/283 |
| 2019/0231111 A1 * | 8/2019 | Cotter | | A47J 17/16 |

* cited by examiner

APPLE PARER

PRIORITY CLAIM

This application claims the benefit of U.S. provisional application No. 62/623,925 filed Jan. 30, 2018, the contents of which are incorporated by reference.

SUMMARY OF THE INVENTION

The present invention relates to a device for paring apples, and in accordance with a preferred version of the invention the device is configured with a main body having a platform which is raised above a lower foundation for the main body. In one example, the main body is supported by a platform comprising one or more fixed forward feet and one or more rearward feet carried on a stand which is moveable between extended and stowed positions. When extended, the rear feet raise the main body above a horizontal work surface and provide an open space about a horizontal or inclined portion of the main body platform which is suitable for grasping by a user. The user may then operate a crank handle with the other hand to drive a threaded axle carrying an apple toward a blade assembly.

In a further preferred version, the device includes a blade assembly having a slicing blade, a peeling blade, and a coring blade. Each of the blades is removably mounted to the main body. Most preferably, the peeling blade is removably mounted to a rocker arm, which is mounted to the main body.

In one example, a main body has a platform with a crank support extending upwardly from a first end of the main body, and a blade support positioned on a second end of the main body. A stand is attached to the first end of the main body and configured to support the main body on a horizontal surface, the stand elevating the crank support and the first end of the platform above the second end of the platform when the main body is resting upon the horizontal surface. A blade assembly is attached to the blade support and extending upwardly away from the blade support. A crank arm is mounted to the crank support, with a threaded axle having a first end connected to the crank arm and a second end having one or more prongs, the threaded axle extending from the crank support toward the blade assembly, wherein rotation of the crank arm causes rotation of the threaded axle and corresponding movement of the threaded axle in a direction from the crank support toward the blade assembly. A rocker arm has an upper end and a lower end, the lower end being pivotally attached to the second end of the main body and including a spring biasing the upper end of the rocker arm pivotally toward the threaded axle, the upper end of the rocker arm having a peeler blade.

In one version, the platform further comprises a first platform section and a second platform section, the first platform section being separated from the second platform section by a gap, whereby a user may grasp one of the first platform section or the second platform section by placing a hand of the user in the gap.

In some examples, the first platform section is elevated above the horizontal surface when the apple peeler is supported by the horizontal surface.

The platform preferably defines a platform axis which is non-parallel with respect to the horizontal surface when the apple peeler is supported by the horizontal surface.

In some versions, the crank support defines an upright axis, the upright axis being substantially perpendicular to the platform axis and further being non-perpendicular with respect to the horizontal surface when the apple peeler is supported by the horizontal surface.

The rocker arm preferably further comprises a peeler blade mount, the peeler blade being attached to the peeler blade mount, the peeler blade mount further being removably attached to the upper end of the rocker arm.

Most preferably, the rocker arm further comprises a peeler blade mount, the peeler blade being attached to the peeler blade mount, the peeler blade mount further being removably attached to the upper end of the rocker arm.

In some versions, the peeler blade mount further comprises a ramp, the ramp having a face which is inclined upwardly and outwardly in a direction from the lower end of the rocker arm to the upper end of the rocker arm.

Preferably, the peeler blade mount further comprises a flange extending in a direction away from the peeler blade.

In some examples, the lower end of the rocker arm comprises a knuckle, the seating surface being formed on the knuckle.

In some examples, a monument extends upwardly from the platform, the monument having a diagonal slot, the rocker arm lock further comprising an elongated rod trained within the diagonal slot, whereby movement of the elongated rod within the diagonal slot allows the rocker arm to be selectively released or locked.

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

Figure 1:
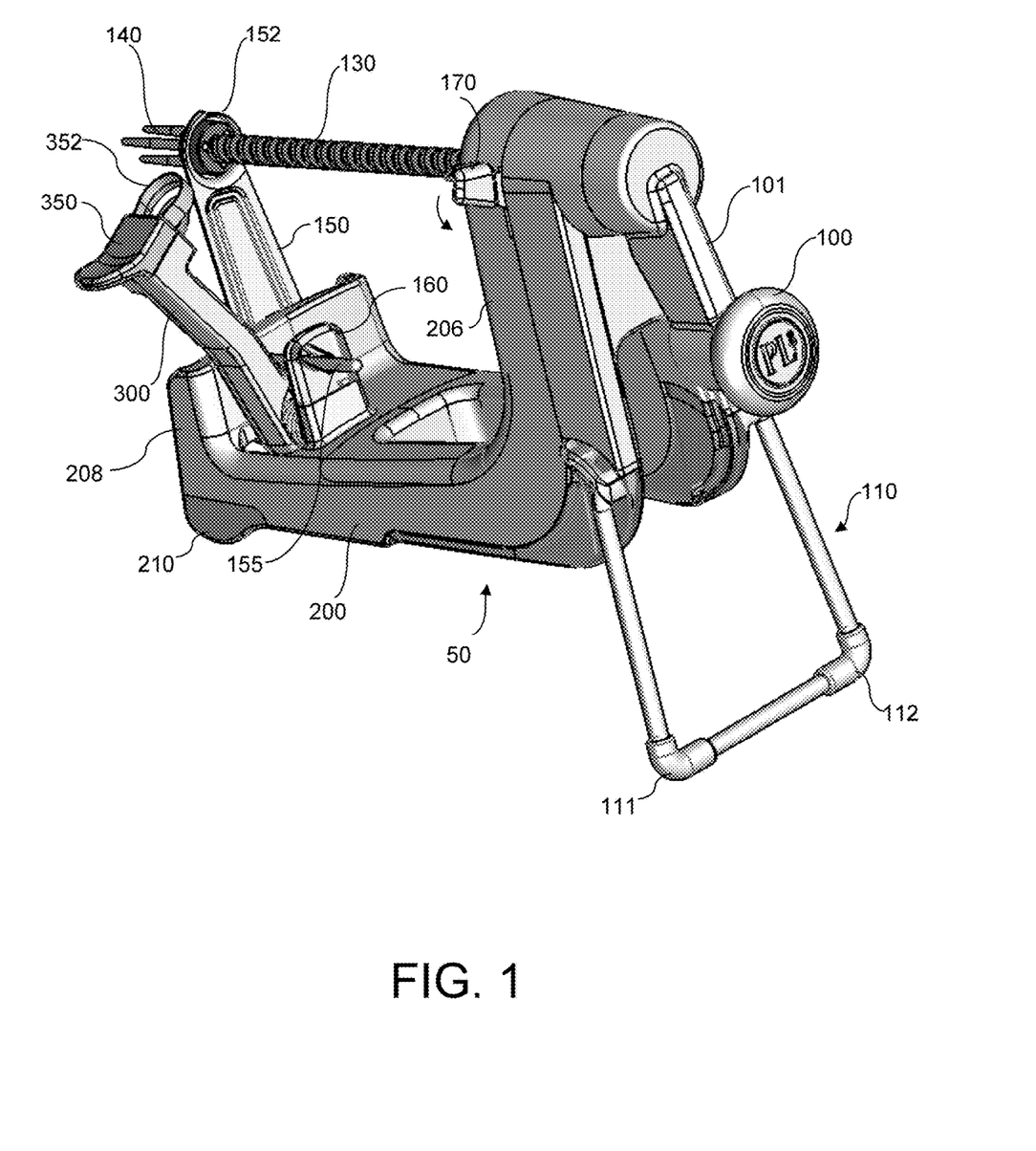
FIG. 1 is a top right/rear perspective view of a preferred apple paring tool.

FIG. 1 illustrates a top perspective view of a preferred apple paring tool of the type configured to peel, slice, and core an apple by operation of a crank handle.

Figure 2:
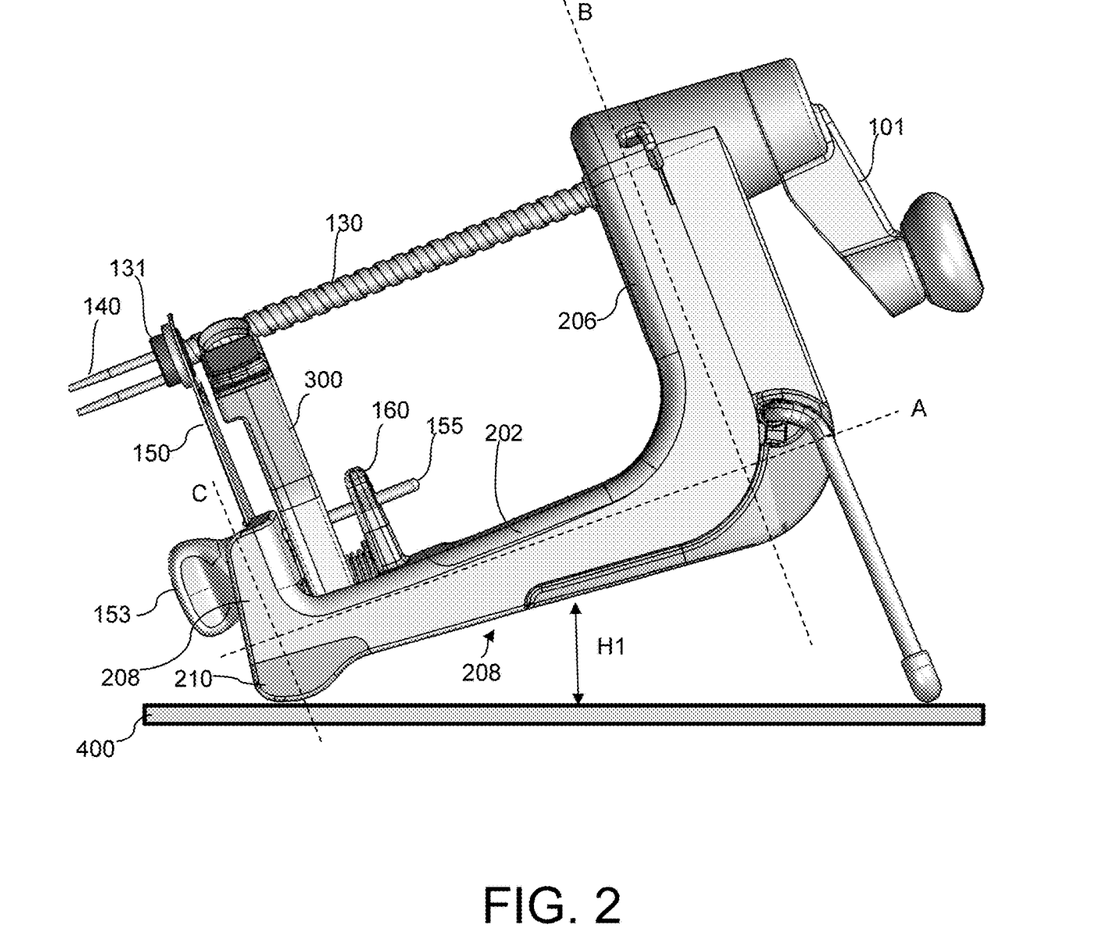
FIG. 2 is a right side elevational view of a preferred apple paring tool.
Figure 3:
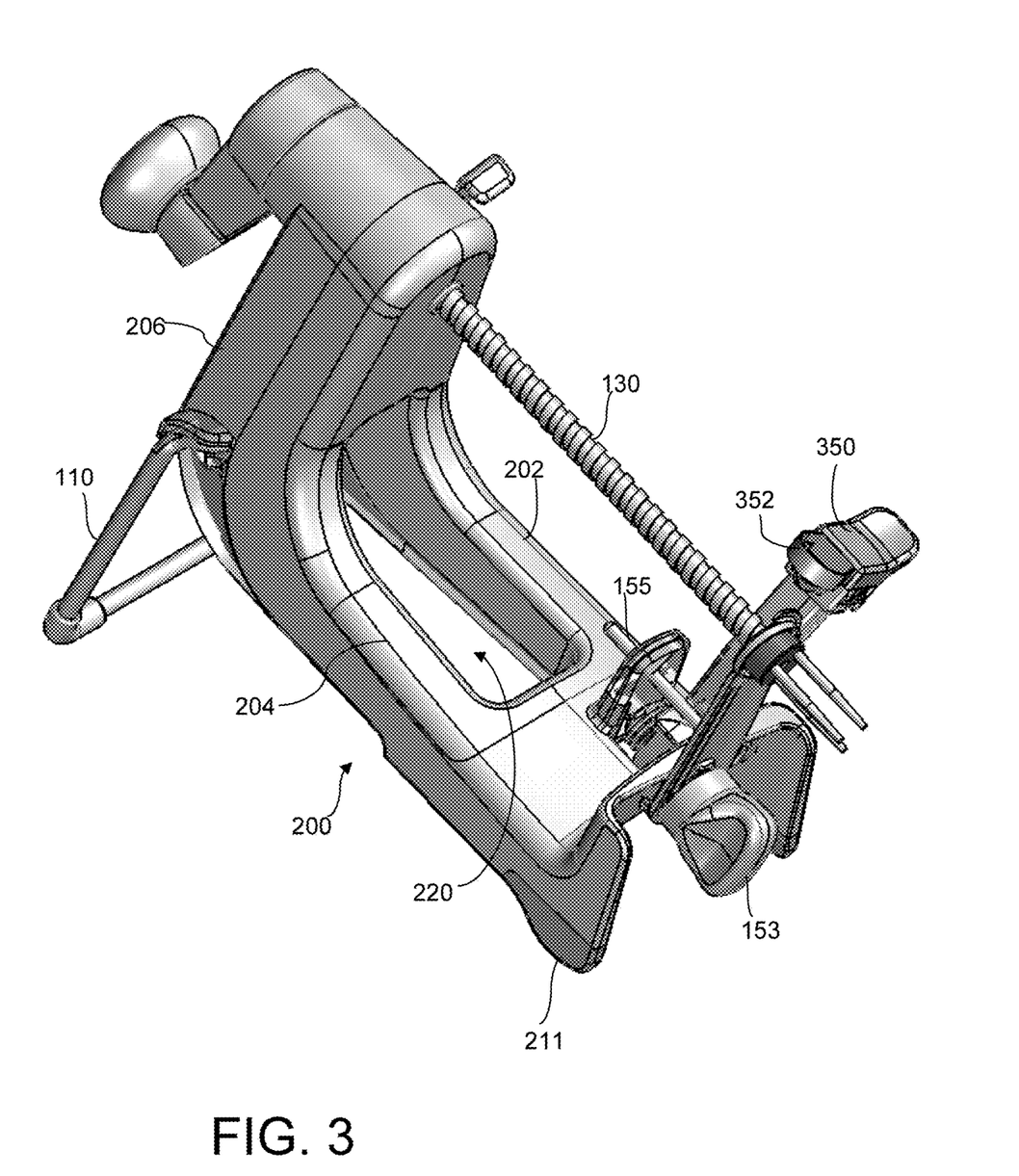
FIG. 3 is a top left/front perspective view of a preferred apple paring tool.

The preferred version of the tool includes a main body 50 having an upright crank support 206 and a platform 200 which is preferably configured as a pair of separated platform sections, including a first platform section 202 and a second platform section 204, as best seen in FIG. 3. In one example, the crank support extends from the platform at a right angle, or substantially a right angle, such as seen by the intersection of a platform axis A and an upright axis B, shown in FIG. 2. The crank support is positioned at a first end of the platform, and at the opposite second end of the platform the main body is configured with a blade support structure 208. The blade support structure preferably extends upward from the platform in a generally vertical direction with respect to the relatively horizontal platform (when the platform is oriented horizontally, such as in FIG. 5), parallel to the crank support, and along a blade support axis C. In each case, the axes B and C are at least substantially perpendicular to the platform axis, meaning that they are within a range of 75 degrees to 105 degrees with respect to the platform axis. In other versions, the blade support structure need not extend upward from the platform, and may instead be configured as one or more mounting structures for the various blades.

A crank arm 101 having a crank handle 100 is carried on the crank support 206 and connected to one end of a threaded rod 130 such that rotation of the crank handle causes rotation of the threaded rod or axle. Rotation of the threaded axle will cause the axle to move toward (or away from, depending on the direction of rotation) a set of blades 150 supported by the blade support end 208 of the main body. In the preferred version, as best seen in FIG. 2, the rod 130 defines a rod axis which is parallel to the platform axis A, and further which is transverse to the horizontal surface 400 on which the peeler is supported. Preferably the axis A, and that of the threaded rod, is at an angle of greater than 15 degrees with respect to the horizontal surface.

An axle release lever 170 extends from the main body and is pivotally mounted for movement in the direction of the arrow as indicated in FIG. 1 adjacent the axle release lever. When in the position of FIG. 1, the threads of the axle 130 engage a flange or finger extending from a plate within the main body to facilitate movement of the threaded axle as described further below. When the axle release lever is pivoted away from the threaded axle, it allows the axle to be moved axially toward or away from the blade 150, without rotation of the crank arm 101.

The main body is supported by a pair of fixed elastomeric forward feet 210, 211 at the first end of the main body, preferably beneath the blade support structure, and by a moveable stand 110 at the crank support end. The moveable rearward stand 110 is preferably configured as a U-shaped wire having a pair of elastomeric rear feet 111, 112.

The threaded axle 130 carries one or more spikes or prongs 140 at the end opposite the crank handle, in which the prongs are configured to be pressed into an apple to secure the apple to the axle.

A slicing blade 150 is mounted to the blade support structure and extends generally upward from the blade support structure. Preferably the slicing blade is formed from stainless steel and has a sharpened edge 151 along one side (see FIG. 9), extending vertically from top to bottom. The slicing blade terminates with an upper coring blade 152, best seen in FIG. 9, generally formed as a circular or slightly helical blade having a central generally circular opening. The coring blade is sized and arranged so that the prongs 140 and adjacent head 131 on the axle 130 can extend fully through the circular opening. As the axle rotates and moves toward the coring blade, an apple carried on the prongs will be rotated and forced through the coring blade, thereby cutting a cylindrical core from the apple.

Figure 6:
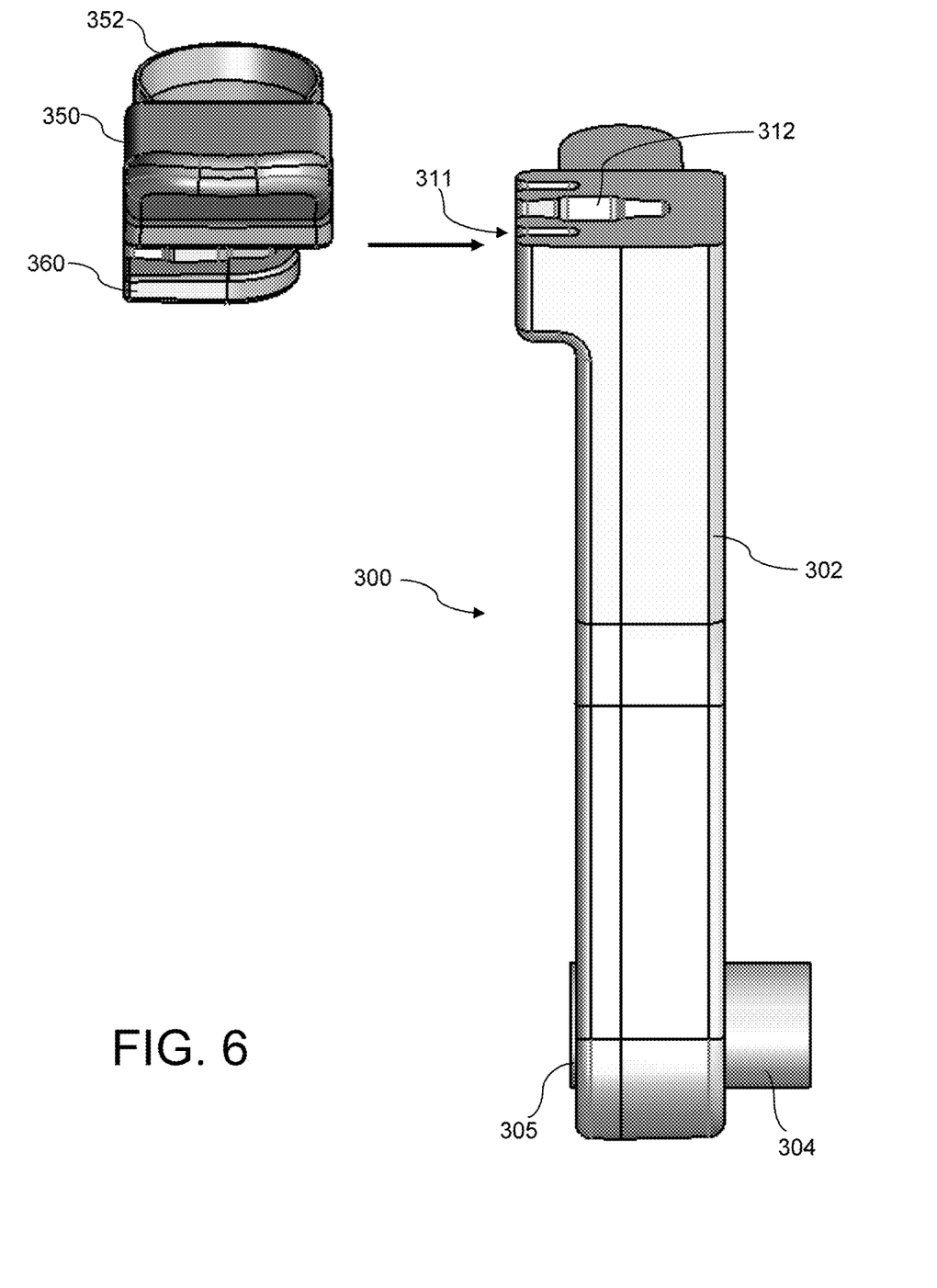
FIG. 6 is a partial side elevational exploded view of a rocker arm for use with a preferred apple paring tool.
Figure 7:
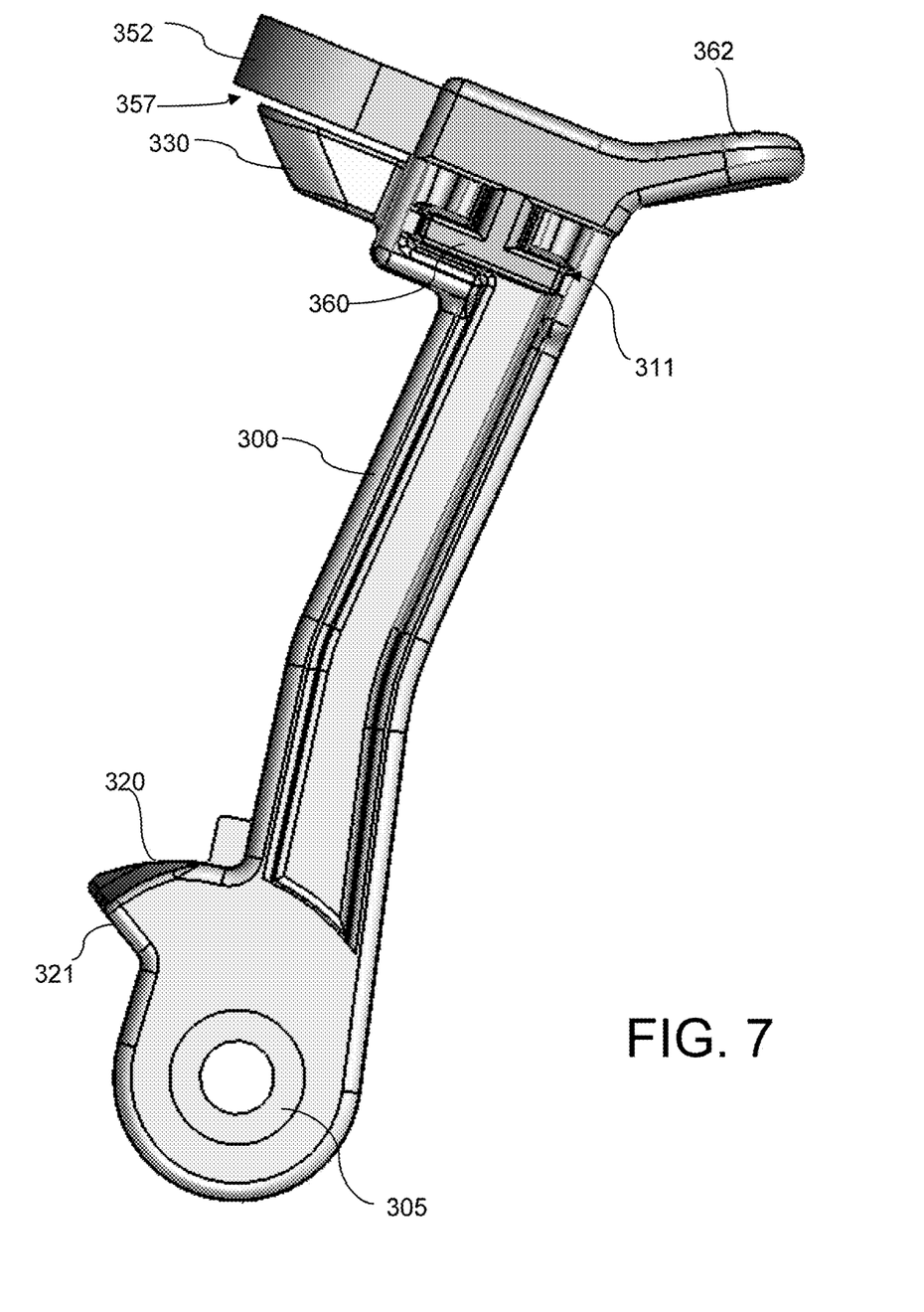
FIG. 7 is a front elevational view of a rocker arm for use with a preferred apple paring tool.
Figure 8:
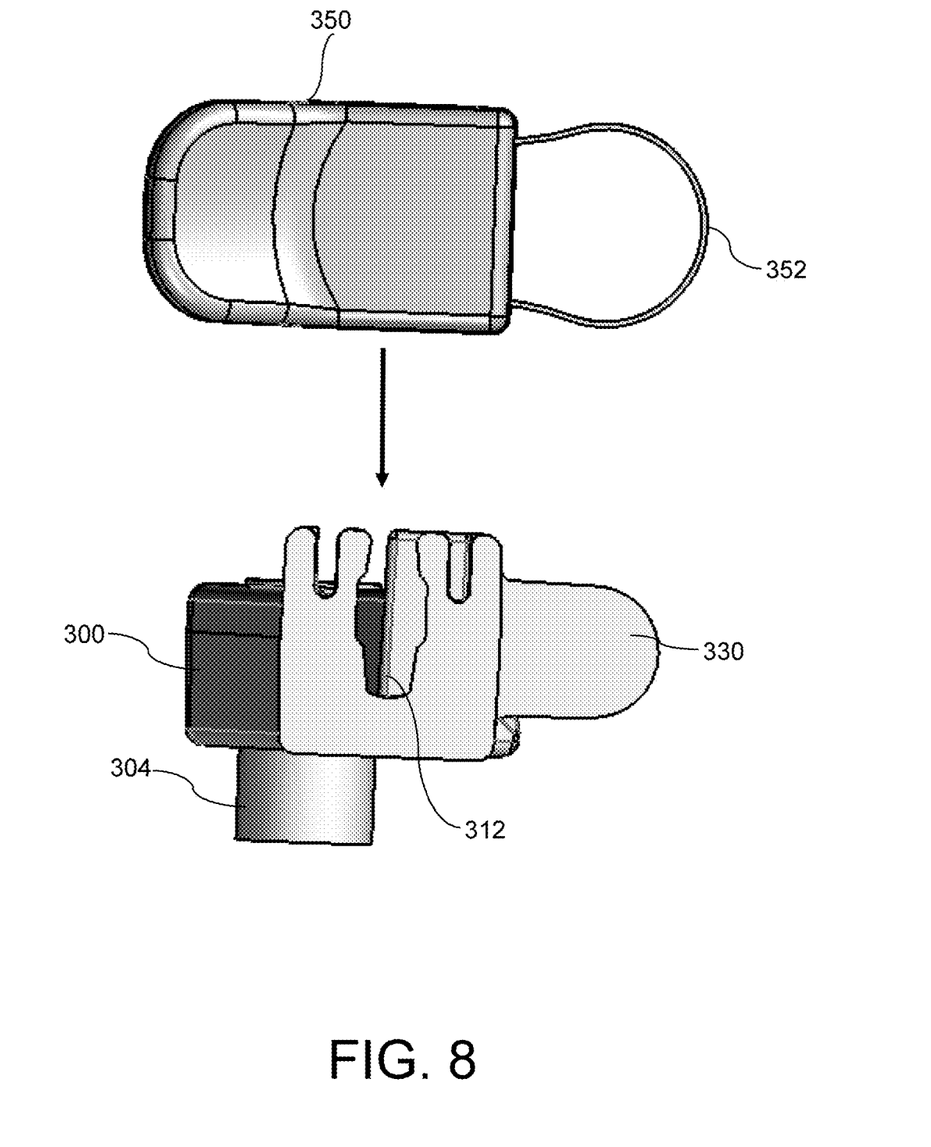
FIG. 8 is a top exploded view of a rocker arm for use with a preferred apple paring tool.
Figure 11:
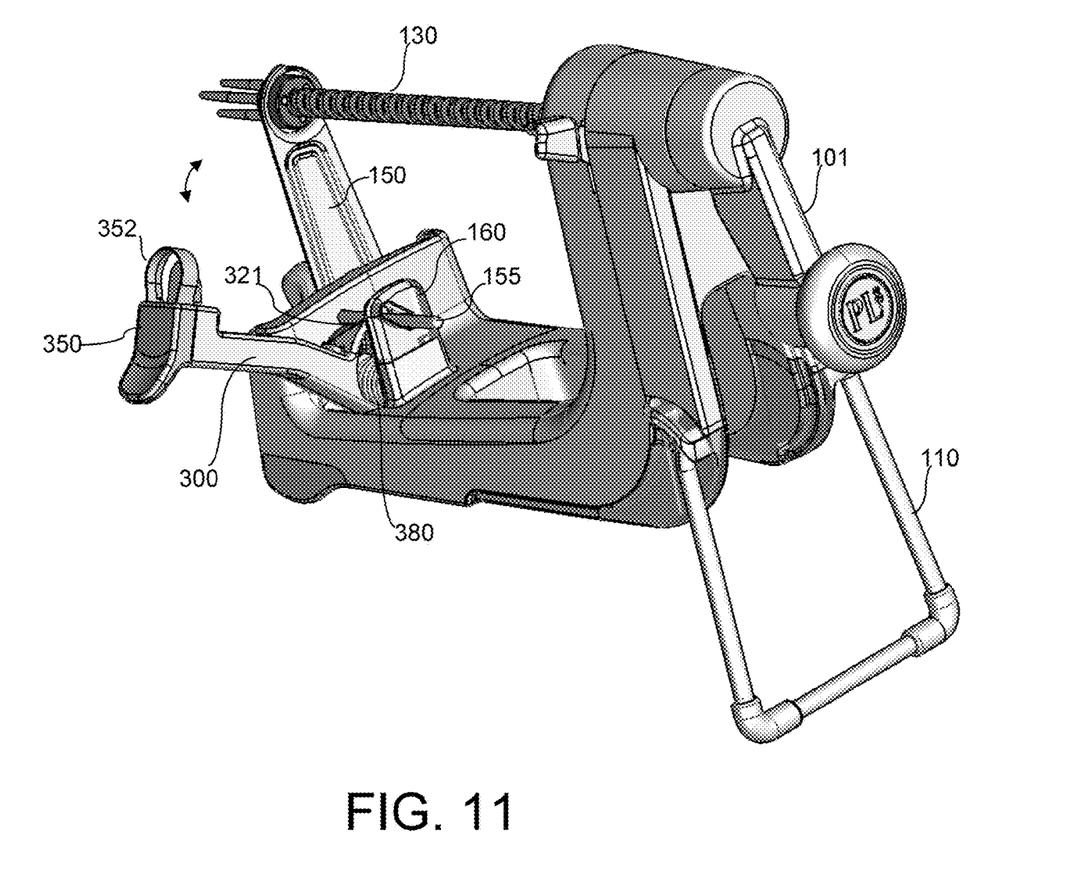
FIG. 11 is a top right/rear perspective view of a preferred apple paring tool, shown with a rocker arm rotated downward.

A rocker arm 300 is mounted to the blade support assembly, pivotally attached at a lower end of the rocker arm so that an upper end may pivot toward and away from the slicing blade 150 in the directions of the arrow indicated in FIG. 11. As best seen in FIGS. 6-8, the rocker arm carries a peeling blade mount 350 having a peeling blade 352 at one end of the rocker arm, opposite the pivotal attachment. Preferably, the peeling blade mount is configured as a removably attachable peeling blade attachment. A spring (preferably a coil spring 380) is attached to the pivotal end of the rocker arm urge the upper, peeling blade end of the rocker arm toward the coring blade, but to allow for the rocker arm to be pivoted away from the coring blade upon application of a sufficient force to overcome the spring force.

In some cases, a user may desire not to use the peeling blade, and therefore a rocker arm lock 155, preferably formed as an elongated rod, is mounted to the blade support structure and extends into a diagonal slot 310 within a vertical monument 160 to allow a user to lock the rocker arm in a position rotated away from the coring blade and therefore out of reach or contact with an apple that is carried by the axle.

As best seen in the side elevational view of FIG. 2, the rear end of the main body (that is, the end carrying the crank support) is raised above a horizontal surface 400 such as a countertop when the apple parer is configured for use and the rear stand is deployed. At a central location along one of the platform sections 202, the platform extends above the countertop or horizontal surface by a distance H1. In a preferred version, the distance or height H1 is large enough for a user to grasp the platform section and extend his or her fingers about the platform section and partially or fully beneath the platform section and within the area defined by the height H1. In one example, a central portion of the platform is at least one inch, or more preferably at least two inches or at least three inches above the horizontal work surface.

Preferably when the rear legs are extended for use, the crank support and the blade mount are each inclined (as indicated by axes B and C), and therefore non-perpendicular with respect to a countertop or horizontal surface 400.

Although the main body includes a pair of platform sections in the preferred version, in other versions it may have only a single platform section. In yet other versions, the main body or platform may have a raised handle or grip in the area between the crank support and the blade support.

As seen in FIG. 2, the slicing blade is removably attached to the blade support by a bolt having an enlarged knob 153 on one end, in which the bolt is received within a threaded nut or barrel positioned in the blade support structure.

FIG. 3 is a top perspective view of the preferred apple parer, taken from the blade support structure end rather than the crank support end. From this perspective, the preferred pair of platform sections 202, 204 is visible, combining to form the platform 200. In this example of the invention, a gap or span 220 is provided between the platform sections 202, 204, in which the gap is preferably sized to allow a user to extend a hand into the gap to grasp either of the two platform sections. A second forward foot 211 is visible from this side of the device.

Figure 4:
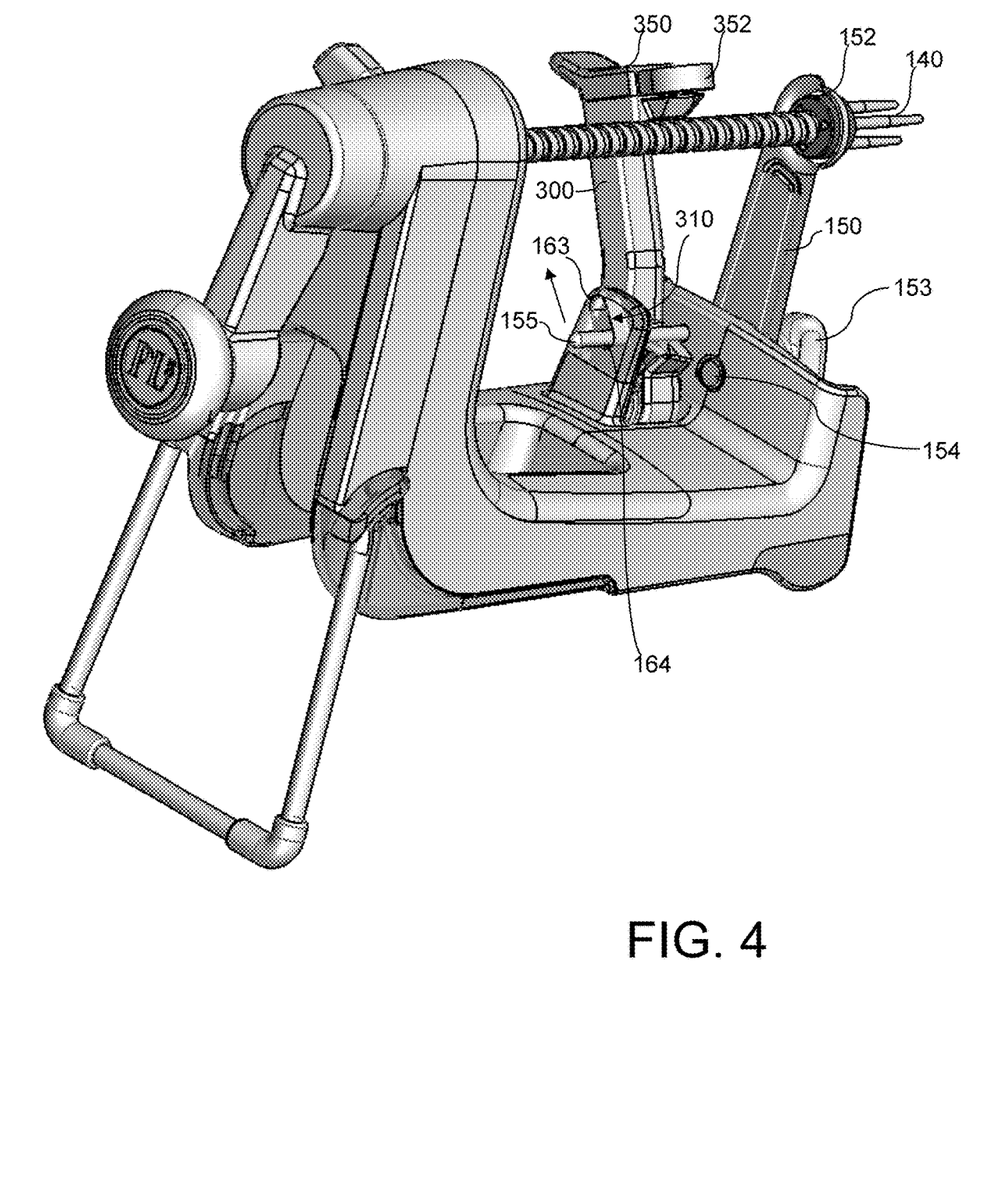
FIG. 4 is a rear/left perspective view of a preferred apple paring tool.

FIG. 4 is another top perspective view of the preferred apple parer, taken from the opposite side in contrast with the perspective view of FIG. 1. In this view, the threaded bolt 154 attached to the knob 153 is visible, mounted in the blade support structure and attaching the slicing blade 150 to the blade support structure.

As further indicated in FIG. 4, the rocker arm lock 155 is moveable within the diagonal slot 310 of the vertical monument between a first upper position 163 and a second lower position 164, along a direction defined by the arrow in FIG. 4 corresponding to the angle of the inclined or diagonal slot 310. Depending on the position of the rocker arm 300, movement of the rocker arm lock 155 may release the rocker arm or lock it in position rotated away from the coring blade.

Figure 5:
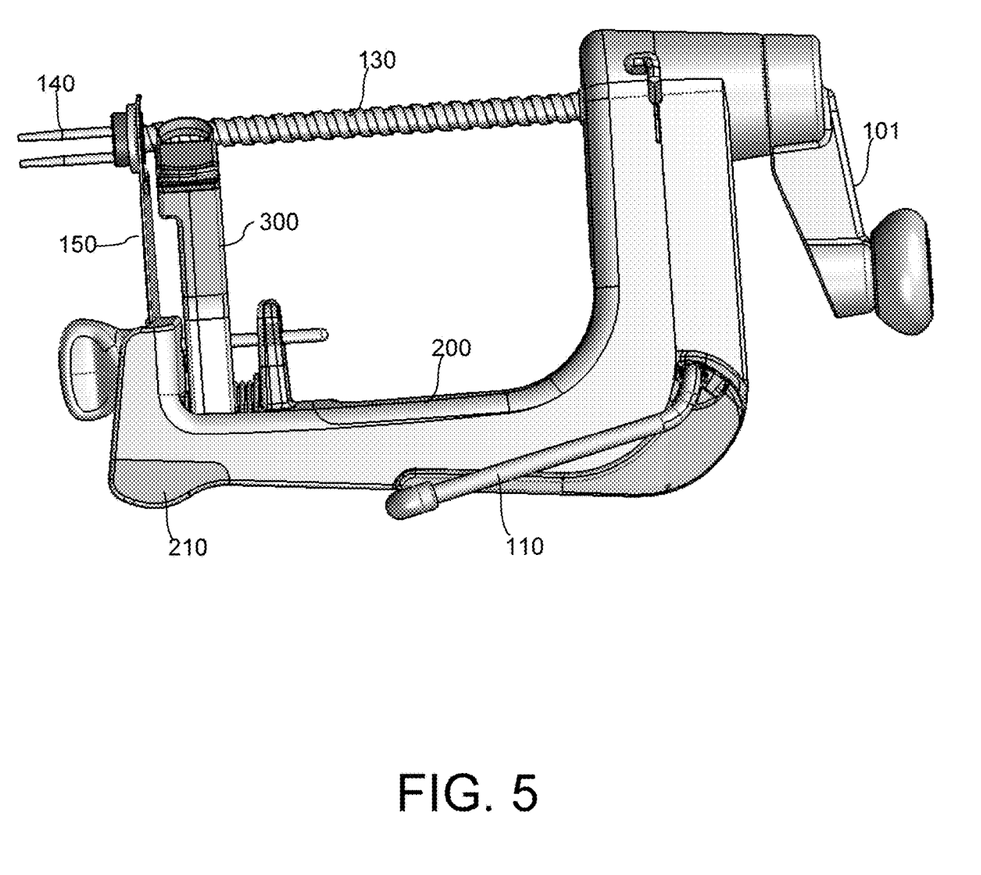
FIG. 5 is a right side elevational view of a preferred apple paring tool, shown with rear legs in a retracted position.

FIG. 5 is a side elevational view of the preferred apple parer, showing the rear stand 110 in a stowed position for storage.

FIG. 6 illustrates an exploded view of a rocker arm 300 and peeling blade mount or attachment 350. As indicated, the peeling blade attachment can be attached to the top of the rocker arm 300 by sliding it into the upper mount in the direction of the arrow in FIG. 6. In one version, the peeling blade attachment includes a peeling blade 352, formed as a thin stainless steel strip configured as a portion of a loop on one end of the peeling blade attachment. The peeling blade attachment further includes a lower flange 360 configured to be received within a mating slot 311 formed in the top of the rocker arm 300. The top of the rocker arm also preferably includes one or more keyed channels 312 configured to mate with corresponding shapes formed in a stem above the lower flange 360, to allow the peeling blade attachment to snap-fit into the top of the rocker arm to firmly retain the peeling blade attachment on the rocker arm.

As further seen in FIG. 6, a lower end of the rocker arm includes an axle 304 which extends outward from the lower end. The rocker arm further includes an elongated body 302 extending from the axle 304 toward the upper end having the slot as described above.

FIG. 7 illustrates the rocker arm 300 having the peeling blade attachment 350 mounted, but in which the rocker arm is separated from the apple peeler and blade support structure. The peeling blade attachment includes a deflector 330 having a ramp formed as an inclined face extending upwardly and outwardly toward the peeling blade 352 to receive an outer surface of an apple and direct it toward the peeling blade 352. A gap 357 is provided between a tip of the deflector and the edge of the peeling blade, and most preferably the gap is sized to allow the peeling blade to remove the peel from an apple but not to cut more deeply into the apple.

The peeling blade attachment includes an extension 362 serving as a grip or handle so that the user may grasp the extension to remove the peeling blade attachment from the rocker arm. As illustrated, the extension is positioned diametrically opposite the blade 352 in one version, with the flange 360 extending below the peeling blade attachment at a location centrally between the blade 352 and the extension 362. In a preferred example, the peeling blade attachment is over-molded to the stainless steel peeling blade.

The lower end of the rocker arm 300, opposite the peeling blade attachment mount and in the vicinity of the axle, includes a knuckle 320 having a surface 321 for engaging the rocker arm lock 155. The knuckle is positioned and sized so that the rocker arm can be rotated in a position pivoted away from the coring blade (as in FIG. 11) and then the rocker arm lock 155 is moved along the slot 310 in the monument 160 until it engages a seating surface 321 on the knuckle 320 to prevent rotation of the rocker arm back again toward the coring blade.

FIG. 8 is a top plan view of the exploded combination of the peeling blade attachment 350 and rocker arm 300, showing a preferred arrangement of the keyed channels 312 for receiving the flange and mating keyed stem of the peeling blade attachment.

Figure 9:
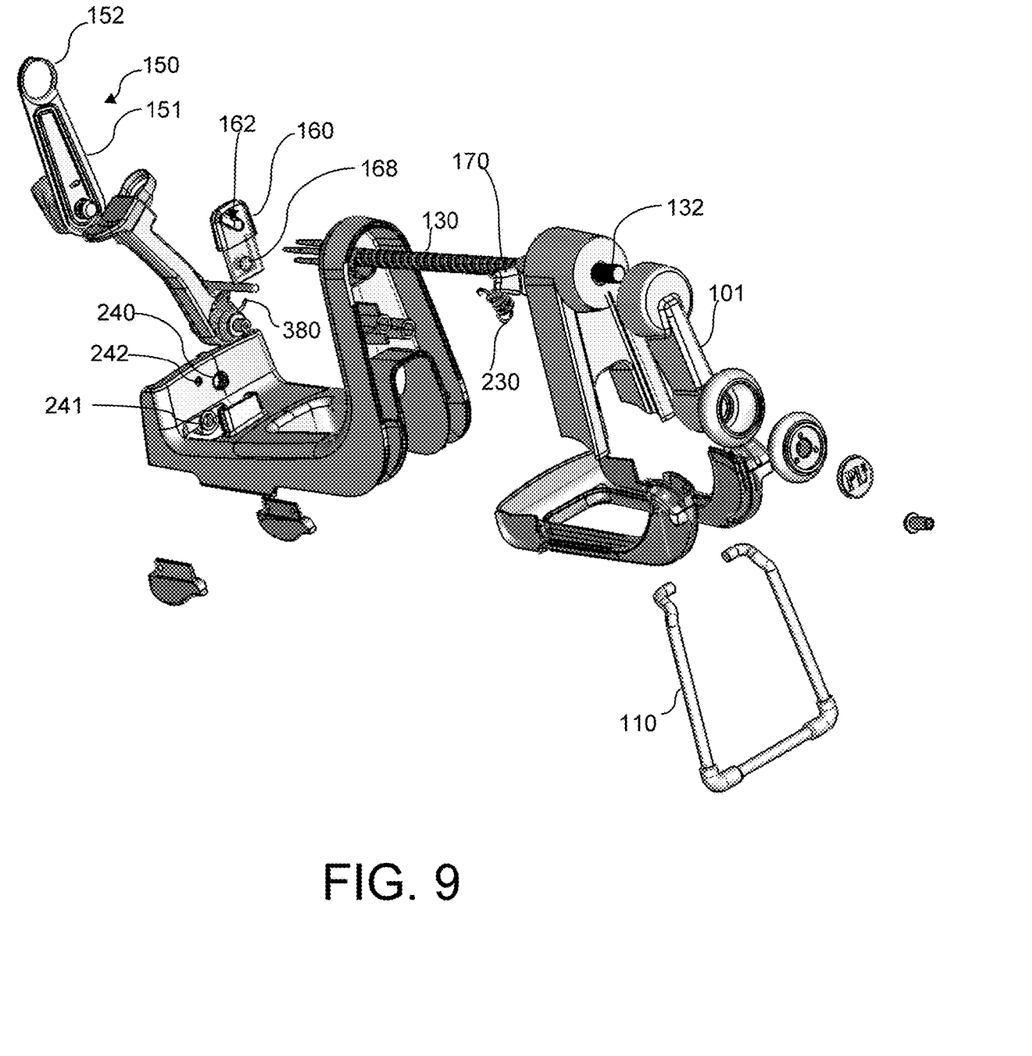
FIG. 9 is a top right/rear perspective exploded view of a preferred apple paring tool.

FIG. 9 is an exploded view of a preferred apple paring device. In this view, details of the blade support structure are visible, including a threaded mount 240 extending through the structure for receiving the slicing blade bolt. In addition, a bore 242 formed in the blade support structure is arranged for supporting the rocker arm lock. A boss 241 is also provided for receiving a first axle 305 (not visible in FIG. 9; see FIGS. 6 and 7) at the pivot end of the rocker arm to pivotally mount the rocker arm to the blade support structure. An additional boss 168 is formed at the base of the blade lock monument 160 and is configured to receive a second axle 304 (see FIG. 6) formed in the opposite side of the rocker arm 300, so that the rocker arm is trapped between the two bosses for pivotal rotation. A coil spring 380 is carried on the second axle 304, with a first end attached to the rocker arm and abutting a shoulder formed on the rocker arm, and a second end attached to and abutting one of the monument, platform, or blade support structure. The coil spring urges the peeling blade end of the rocker arm pivotally toward coring blade while allowing the rocker arm to rotate in the opposite direction upon application of a force sufficient to overcome the spring force.

Figure 10:
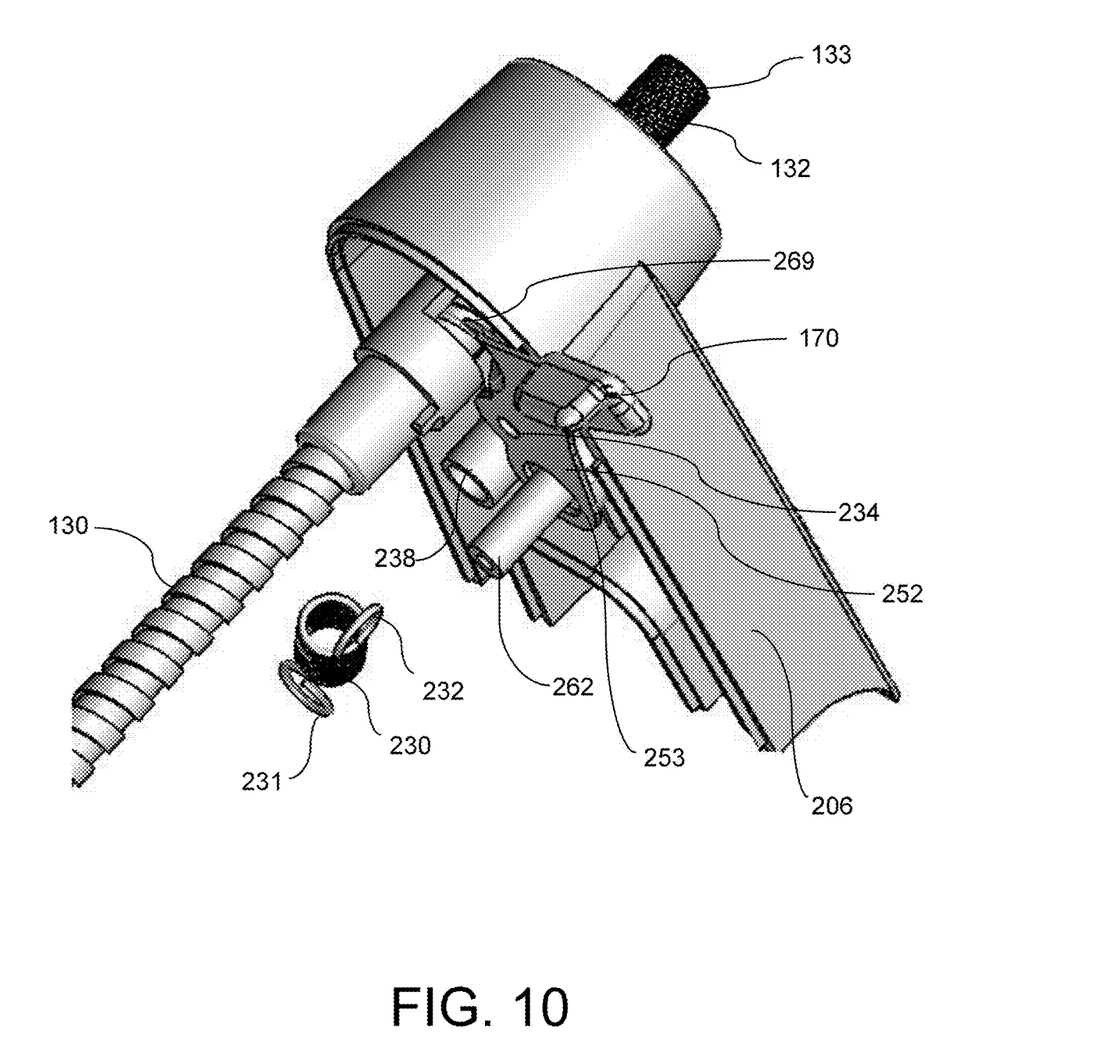
FIG. 10 is a partial cutaway view of a crank support and threaded rod for use with a preferred apple paring tool.

FIG. 10 is a partial cutaway view of the crank support structure 206. As illustrated, the main axle 130 is formed with relatively wide threads 130 to facilitate travel of the main axle toward the slicing and coring blades. The crank end 133 of the axle 130 is formed with smaller threads 132 in the preferred version, for attachment of the crank handle to the axle.

An axle release lever 170 extends out of the crank support structure and is preferably attached to a guide plate 252. The guide plate includes a first bore 253 configured to receive a pin 262 carried on the crank support so that the guide plate may pivot about the pin. The guide plate terminates in a flange or finger 269 that is sized to fit between the wide threads on the main axle 130, and which is seated within the channel of the threads, so that the interaction of the guide plate finger and the axle threads cause the axle to move in an axial direction upon rotation by the crank handle.

The guide plate is biased toward the axle 130 by a spring 230 having a first end 231 mounted on a barrel 238 formed on the crank support and a second end attached to a hole 234 formed in the guide plate. A user may grasp the release lever 170 and rotate it downward toward the platform, thereby removing the finger from the threads of the axle. In this released position, the axle may be moved in the axial direction freely, toward or away from the coring blade, by simply pulling on or pushing on the crank handle without rotating it. The release lever will be returned to its engaged position by the return force of the release lever spring 230.

FIG. 11 shows the rocker arm 300 in position rotated away from the blade 150, with the rocker arm lock 155 engaging the seating surface 321 of the knuckle of the rocker arm to hold it in position. From this position, the peeling blade 352 is moved away from an apple carried on the prongs.

In use, a user attaches an apple to the prongs on the axle, with the axle moved away from the coring and slicing blades at a distance sufficient to allow the apple to be attached. For this purpose, the release lever may be rotated to allow the main axle to be moved to a desired position. If the user wants to peel the apple while slicing and coring it, the rocker arm is moved to the position rotated toward the coring blade, with the rocker arm lock positioned accordingly. If peeling is not desired, then the rocker arm is rotated away from the coring blade and held in position by the rocker arm lock. With the rocker arm and peeling blade positioned as desired, the user rotates the crank handle while grasping the platform (including one or the other of the platform sections, as desired) to hold the main body in position. The crank handle is rotated to drive the axle toward the slicing and coring blades, and is continued in this fashion until the apple has been pushed all the way through the coring blade. At this point the apple can be removed from the prongs and the axle returned to its starting positon to be used again.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims.

I claim:

1. An apple peeler, comprising: a main body having a lower surface and having a platform with a crank support extending upwardly from a first end of the main body, and a blade support positioned on a second end of the main body;
    a stand attached to the first end of the main body and configured to support the main body on a horizontal surface, the stand elevating the crank support and the first end of the platform above the second end of the platform when the main body is resting upon the horizontal surface at its second end;
    wherein the stand has a distal end and a proximal end, the proximal end is pivotally mounted about an axis perpendicular to the rotational axis of a threaded axle, the stand has a first pivotal position where the distal end is adjacent to the lower surface of the main body, and a second pivotal position where the distal end is spaced apart from the main body and is configured to support the main body on and spaced from the horizontal surface;
    a blade assembly attached to the blade support and extending upwardly away from the blade support; a crank arm mounted to the crank support; the threaded axle having a first end connected to the crank arm and a second end having one or more prongs, the threaded axle extending from the crank support toward the blade assembly, wherein rotation of the crank arm causes rotation of the threaded axle and corresponding movement of the threaded axle in a direction from the crank support toward the blade assembly; and a rocker arm having an upper end and a lower end, the lower end being pivotally attached to the second end of the main body and including a spring biasing the upper end of the rocker arm pivotally toward the threaded axle, the upper end of the rocker arm having a peeler blade.

2. The apple peeler of claim 1, wherein the platform further comprises a first platform section and a second platform section, the first platform section being separated from the second platform section by a gap, whereby a user may grasp one of the first platform section or the second platform section by placing a hand of the user in the gap.

3. The apple peeler of claim 2, wherein the first platform section is elevated above the horizontal surface when the apple peeler is supported by the horizontal surface.

4. The apple peeler of claim 2, wherein the platform defines a platform axis which is non-parallel with respect to the horizontal surface when the apple peeler is supported by the horizontal surface.

5. The apple peeler of claim 4, wherein the crank support defines an upright axis, the upright axis being substantially perpendicular to the platform axis and further being non-perpendicular with respect to the horizontal surface when the apple peeler is supported by the horizontal surface.

6. The apple peeler of claim 5, wherein the rocker arm further comprises a peeler blade mount, the peeler blade being attached to the peeler blade mount, the peeler blade mount further being removably attached to the upper end of the rocker arm.

7. The apple peeler of claim 1, wherein the rocker arm further comprises a peeler blade mount, the peeler blade being attached to the peeler blade mount, the peeler blade mount further being removably attached to the upper end of the rocker arm.

8. The apple peeler of claim 7, wherein the peeler blade mount further comprises a ramp, the ramp having a face which is inclined upwardly and outwardly in a direction from the lower end of the rocker arm to the upper end of the rocker arm.

9. The apple peeler of claim 8, wherein the peeler blade mount further comprises a flange extending in a direction away from the peeler blade.

10. The apple peeler of claim 7, further comprising:
    a rocker arm lock carried on the first end of the main body; and
    a seating surface positioned on the lower end of the rocker arm, the rocker arm lock being positionable against the seating surface to selectively hold the rocker arm in a position in which the a upper end of the rocker arm is pivoted away from the threaded axle.

11. The apple peeler of claim 10, wherein the lower end of the rocker arm comprises a knuckle, the seating surface being formed on the knuckle.

12. The apple peeler of claim 10, further comprising a monument extending upwardly from the platform, the monument having a diagonal slot, the rocker arm lock further comprising an elongated rod trained within the diagonal slot, whereby movement of the elongated rod within the diagonal slot allows the rocker arm to be selectively released or locked.

* * * * *